United States Patent [19]
Belke et al.

[11] 3,750,294
[45] Aug. 7, 1973

[54] FLOATING THICKNESS MONITOR

[75] Inventors: William H. Belke, Peoria; Weldon L. Phelps, Dunlap; William E. Streight, East Peoria; Robert W. Untz, Hanna City, all of Ill.

[73] Assignee: Caterpillar Tractor Co., Peoria, Ill.

[22] Filed: June 18, 1971

[21] Appl. No.: 154,386

[52] U.S. Cl. ............ 33/147 L, 33/143 L, 33/147 N
[51] Int. Cl. .............................................. G01b 7/06
[58] Field of Search ...................... 33/147 N, 149 J, 33/148 H, 143 L, 141 R, 141 B, 141.5, 142

[56] References Cited
UNITED STATES PATENTS
2,826,818   3/1958   Roeger............................. 33/147 N
2,740,200   4/1956   Strother........................... 33/148 H
3,579,843   5/1971   Peonski............................ 33/147 N Primary Examiner—Robert B. Hull
Assistant Examiner—Richard R. Stearns
Attorney—Charles M. Fryer, Paul S. Lempio et al.

[57] ABSTRACT

An apparatus for measuring the thickness of travelling sheet materials employs a pair of linear displaceable transducers which are disposed in aligned opposition so their respective sensors contact the opposite side of the sheet material, with the sensors mounted so they can "float" with the material to compensate for vibration or movement while maintaining a separation equal to its thickness. Each transducer output is the analog of the displacement of its sensor from a zero position and these analogs can be combined to produce a difference output which is directly proportional to the instantaneous material thickness between the two sensors. The output signal can operate a visual display or recorder indicating the thickness dimension of the sheet material at all times.

1 Claim, 3 Drawing Figures

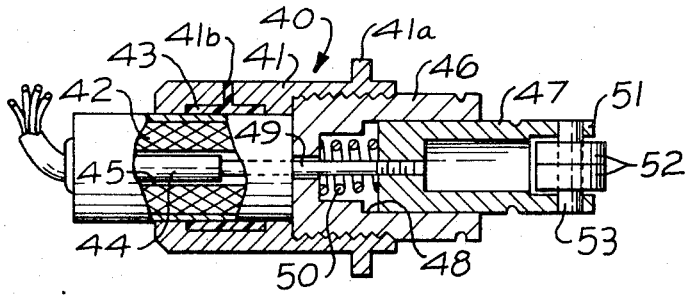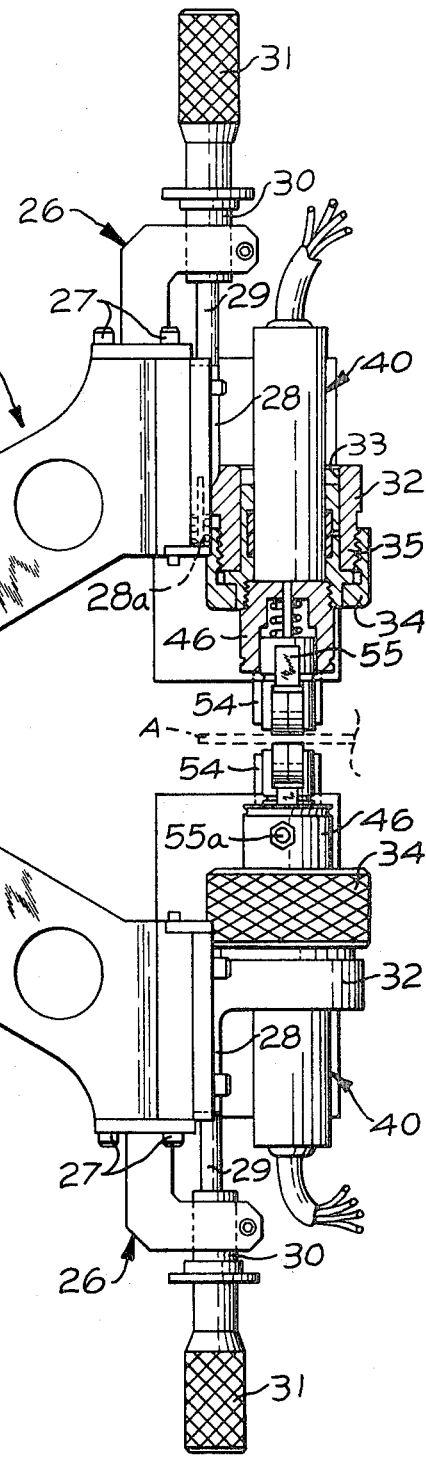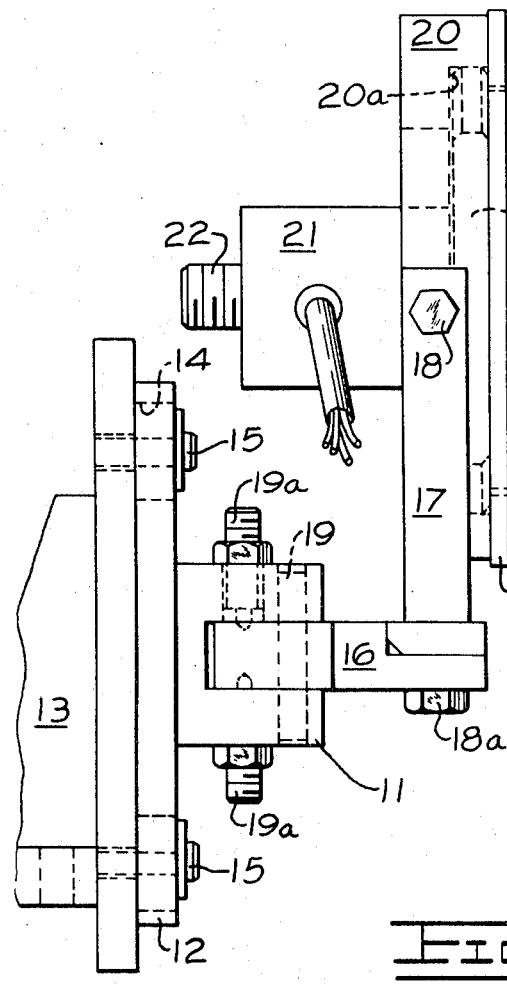

FLOATING THICKNESS MONITOR

BACKGROUND OF THE INVENTION

This invention relates to a device for measuring the thickness of sheet-like material and more particularly for travelling sheet material being manufactured or processed. For example, in many industrial operations a sheet-like material is manufactured or processed as a continuous wide web or belt that is often stored in a roll or on a reel for subsequent use or further processed immediately. Because commerical utilizations of such sheet material often require rigid thickness specificiations, the thickness of such materials must be continuously monitored to insure that their thickness dimension is within prescribed tolerances.

To accurately measure the thickness of such sheet-like materials without stopping their manufacture or processing presents a problem since the sheet or belt or web may pass across the sensors on an angular or skewed course, have movement induced because of its travelling condition or reflect induced machine vibrations, all of which make it extremely difficult to obtain accurate readings on the thickness of the material. Softer sheet material or webs, such as those containing uncured elastomer, pose a further problem of obtaining sensor contact without damaging the sheet material or obtaining erroneous readings due to the physical contact of the sensors with the soft surfaces of the material.

To overcome some of the difficulties above it has been the practice in the past to employ radiation absorption as the technique for obtaining continuous readings on thickness. In such a technique the amount of radiation absorbed when passing through the moving sheet is proportional to the thickness so long as the absorption characteristics of the material are known in advance and constant. Such methods however, generally require a level of radiation which is hazardous to health and also necessitate elaborate safety precautions. Both of these factors increase the cost of employing such techniques and these systems in practical applications are difficult to calibrate and sometimes the measurements are adversely affected by variation in material density, quality or proportions. For example a change in the source of raw materials and/or their compounding can often introduce undetected errors in such systems wherein accurate tolerances are required.

Accordingly, it is an object of the current invention to provide a simple mechanical sensor which overcomes many of the difficulties experienced with prior art devices.

Another object of the current invention is to provide a more economical sensor without loss of accuracy in thickness measurements.

A still further object is a mechanical sensor which maintains substantially uniform pressure against the opposite sides of sheet material as the thickness is monitored.

SUMMARY OF THE INVENTION

The above objects and advantages, as well as others, can be accomplished with a thickness monitoring device having opposed sensors able to float with sheet material under transport conditions while maintaining a separation equal to the thickness of the sheet between its sensors and includes a caliper type frame with arms extending over the top and bottom surfaces of the sheet under transport, transducers mounted on said arms with biased sensors orientated to reciprocate substantially normal to the surfaces of the sheet material with the sensors arranged in aligned opposition so their physical separation corresponds to the thickness of the sheet material passing perpendicularly therebetween and circuits connected to the transducers to convert their respective sensor displacements into a thickness reading by summing their outputs and driving an indicating means therewith.

Adjustments are provided in the connection between the arms and their respective transducers for controlling the bias on the sensors and setting the device. Rollers may be used at the ends of the sensors to reduce friction with the sheet material under transport and averaging circuits can be employed in the circuits to convert the instantaneous thickness reading of the transducers to a time dependent average.

Releasable detent means are provided to maintain the monitoring device in a normal operable position or to permit swing-away action and allow the device to move out of the path of the sheet material when an overthick section is encountered.

BRIEF DESCRIPTION OF THE DRAWINGS

FIG. 1 is an elevation of the caliper monitoring unit of this invention with parts broken away to show additional detail;

FIG. 3 is a broken-away sectional view of one of the transducers employed in the caliper type monitoring unit.

BRIEF DESCRIPTION OF A PREFERRED EMBODIMENT

Figure 2:
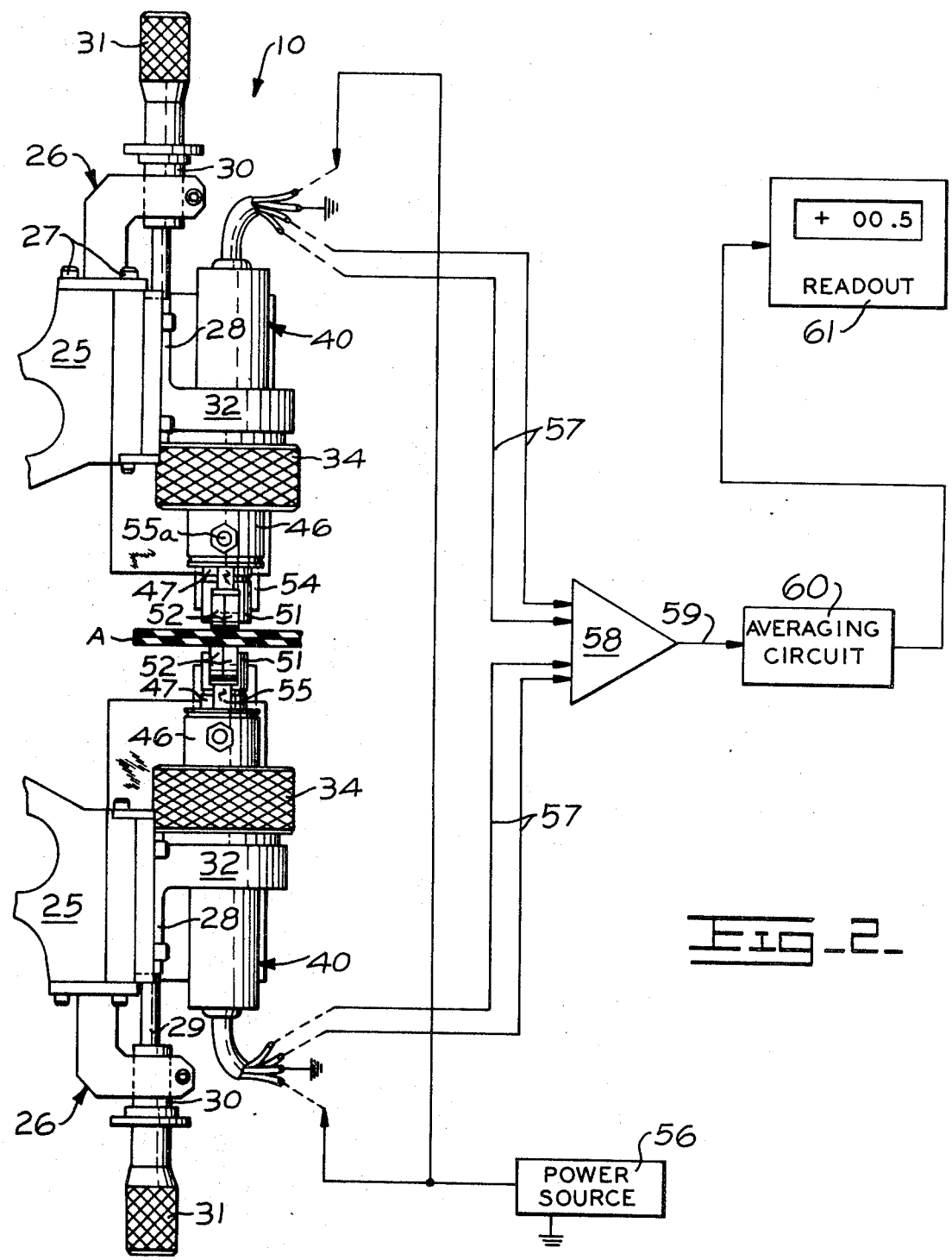
FIG. 2 illustrates the caliper unit shown in FIG. 1 with parts broken away and an accompanying associated circuit diagram in block schematic form.

In FIG. 1 the caliper-type monitoring unit 10 is illustrated supported from a bracket 11 attached to a mounting plate 12. Plate 12 is connected to a machine frame 13 or other suitable support and is preferably adjustable thru slotted holes 14 to permit tilting of the vertical axis of the monitor unit. Bolts 15 serve to lock the monitor unit after desired orientation has been achieved. A pivot arm 16 and wishbone member 17 connect the bracket to the base plate 20 of the transducer unit thru bolts 18 and 18a to complete the mounting arrangement.

Arm 16 is pivotally retained in bracket 11 by a pivot pin 19 and is maintained normally perpendicular to mounting plate 12 by a pair of spring-loaded detent screws 19a. Extending thru the base plate 20 is a housing 21 which has a threaded connector 22 on its projecting end for coupling the transducers of the monitor unit to appropriate circuitry for registering the readings.

A caliper frame 24 has a flange member 23 and two integral diverging arms 25 each terminating in a micrometer adjustment mechanism 26. Flange 23 is retained in a recess 20a in base plate 20 by a keeper plate 25a. The micrometer adjusting mechanisms 26 are secured to the arms with bolts 27 and oriented on the arms in aligned parallel opposition. Each is associated with a reciprocal slide 28 mounted in a dovetail way (not shown) and independently movable toward or away from the slide in the other adjustment mechanism. Each slide is biased outwardly by a pin and spring assembly 28a. A spindle 29 which is journalled in a sleeve 30 against reciprocal movement, is associated with each micrometer adjusting mechanism and is manually extended or retracted by rotating a knurled thimble 31. Each spindle abuts the outermost surface of its respective slide in opposition to the bias force of pin and spring unit 28a, thus limiting axial movement, and turning the thimble in opposite directions will reciprocate the slide for adjustment purposes.

Each slide includes a circular mounting sleeve 32 having a bore 33 therein in axial alignment with a corresponding bore 33 in the other sleeve and caps 34 threaded to the inwardly projecting end 35 of the sleeve are used to secure a transducer unit 40 in each of the sleeves as hereinafter described.

Construction of each transducer unit 40 is identical and is best illustrated in FIG. 3. A cylindrical bonnet 41 forms the outer housing and includes a radial flange 41a which is used to secure the transducer unit in mounting sleeves 32 mentioned above, when cap 34 clamps this flange against the inward projecting end of the mounting sleeve 32 (See FIG. 1). Mounted in one end of a bore in the bonnet 41 is a coil unit 42 which is locked in place with a sealing and bonding agent 43 injected into a groove provided in the bore for this purpose through an appropriate opening 41b as indicated. An armature 44 is reciprocally mounted in the hollow core 45 of the coil unit and its axial movement relative to the coil unit will produce a signal as hereinafter described which has a sense and magnitude proportional to its movement when the coil is excited by the appropriate power source.

The mounting of armature 44 is formed in conjunction with a hollow plug 46 which is screwed into the opposite end of the bonnet 41 with respect to the coil unit and has a piston 47 fitted in its bore 48 that supports the armature in a cantilevered fashion on shaft 49. A spring 50, disposed between one end of the plug and its piston, urges the piston away from the coil unit and insures positive engagement of the sensor formed on the end of the piston with a surface being monitored with the unit.

The piston 47 is axially longer than the bore 48 and its associated plug unit and its projecting end is milled to form a fork 51 in which one or more rollers 52 are journalled on a cross-shaft 53. In this preferred embodiment, the piston and rollers form a reciprocal sensor for each transducer unit and the armature displacement caused by movement of the piston to which it is connected changes the output of the coil unit. Obviously other expedients could be used in place of the rollers illustrated; however, in soft materials a series of rollers provide additional contacting surface eliminating erroneous readings due to depression of the soft surface engaged by the sensor. However, in some instances a ball and socket arrangement might replace the rollers especially if the tracking of the web or sheet material through the monitoring unit is irregular in direction and hard enough to accept the point contact.

When the transducer units 40 are mounted in the caliper frame 24 of the monitor unit, as shown in FIG. 2, the rollers 52 of the two transducer units are in aligned opposition so that the rollers of these respective units will contact one another if no sheet material separates them since springs 50 urge the pistons toward one another in such a mounting. Thus when sheet material passes between the opposed rollers they will be separated by a width equal to the width of the material instantaneously passing between these opposed rollers. The actual locus of the sheet material with respect to the caliper frame may vary (within limits) without changing the net displacement between the opposed rollers since the springs 50 form a resilient suspension system that allows the opposed rollers to follow the sheet material during movement or vibration thereof without changing their net displacement. In the above sense the opposed rollers are able to "float" with the sheet material without engendering any error in the thickness reading. Since the individual transducers are fragile devices with probes capable of limited movement, means to safeguard against overthick material must be provided. To this end opposing mechanical stops 54 associated with the transducer mountings precede rollers 52 in the line-of-flight of the material and will engage an over-tolerance section, exerting a force about pin 19 to cause detent mechanisms 19a to release and permit the monitoring unit 10 to swing out of the path of the material.

A machined flat surface 55 on each piston 47 coacts with a set screw 55a thru the associated hollow plug 46 to prevent turning of the piston to maintain the roll axis of rollers 52 parallel to the line-of-flight of the material and insure relatively friction-free rolling contact between the monitor device and the monitored material.

The tranducer units 40 may be DC to DC linear variable differential transformers (LVDT's) comprised of an oscillator section, a transformer section and a demodulating section. Excitation is provided by a suitable DC source 56 and the transducer oscillators provide transformer excitation of 60H$_z$ or greater. Transformer output is demodulated to permit a DC output signal proportional to displacement.

The coil units 42 of each transducer 40 are composed of three axially aligned coils, with the two outer coils connected together in series opposition to form the secondary and center coil, which forms the primary. With the secondaries so connected, at one position of armature 44, their output is nulled (zero) and any axial displacement of the armature along the hollow core will give a linear voltage increase positive or negative depending on the direction of displacement. Transducers of this type are manufactured by Schaevitz Engineering, Pennsauken, New Jersey.

As a result of the coil connection arrangement in the transducers their outputs can be connected through leads 57 to a summing amplifier 58 where the respective signals are summed to give a summed output on lead 59 which represents the instantaneous displacement of the opposed rollers 52 (subsequent to initial calibration). This summed output of the summing amplifier is connected to an averaging circuit 60 and thence to a readout display 61 or alternatively a recording device for monitoring the thickness of a web A passing between the opposed rollers.

Regarding the summing amplifier 58, a simple integrated circuit, such as a Fairchild 709 operational amplifier, may be used. Connected slightly differently the same operational amplifier can be employed in the averaging circuit 60, and a simple panel meter can be used for a direct visual readout when appropriately calibrated.

We claim:

1. A floating roller thickness monitoring device for webs of sheet material under transport conditions that cause oscillations in such webs comprising:

a caliper frame having spaced extending arms so the distal ends thereof will extend about and below a portion of an edge of a web under transport conditions so such edge will pass continuously therebetween;

a base mounting said caliper frame normal to the direction of travel of such edge of the web under transport conditions, said base including releasable catch means operable to allow said caliper frame to swing clear of such edge when such edge exerts a force greater than a predetermined value on any part of said monitoring device;

separate mounting means adjacent to said distal end of each of said arms, each said mounting means including micrometer adjusted means;

a separate transducer mounted in each of said mounting means in an opposed relationship and adjustable through said micrometer adjusted means, each of said transducers having a linearly movable sensor element oriented in said transducer in aligned opposition with said movable sensor element of said other transducer whereby they reciprocate along on a common axis, each of said sensor elements having a roller at its inboard end with key means operable to orient said roller to properly track on such edge of a web under transport conditions, each of said sensor elements also having biasing means urging it in the direction of the other sensor element whereby said rollers will positively track on opposite surfaces of said edge between said distal ends of said arms, separate transducer means associated with each of said sensor elements operable to produce an electrical signal proportional to displacement of its associated sensor element;

circuit means connected to said transducer means having a summing circuit operable to add said signals and an averaging circuit operable to average instantaneous outputs from said summing circuit over a settable period of time; and meter means connected to said averaging circuit operable to visually display the average separation of said rollers whereby the average thickness of a web under transport can be continuously monitored and said rollers will be swung free of said web if said web exerts an unduly large force thereon.

* * * * *